Sept. 27, 1955  J. R. PIERCE  2,719,187
HIGH FREQUENCY PULSE TRANSMISSION
Filed Aug. 17, 1949  9 Sheets-Sheet 1
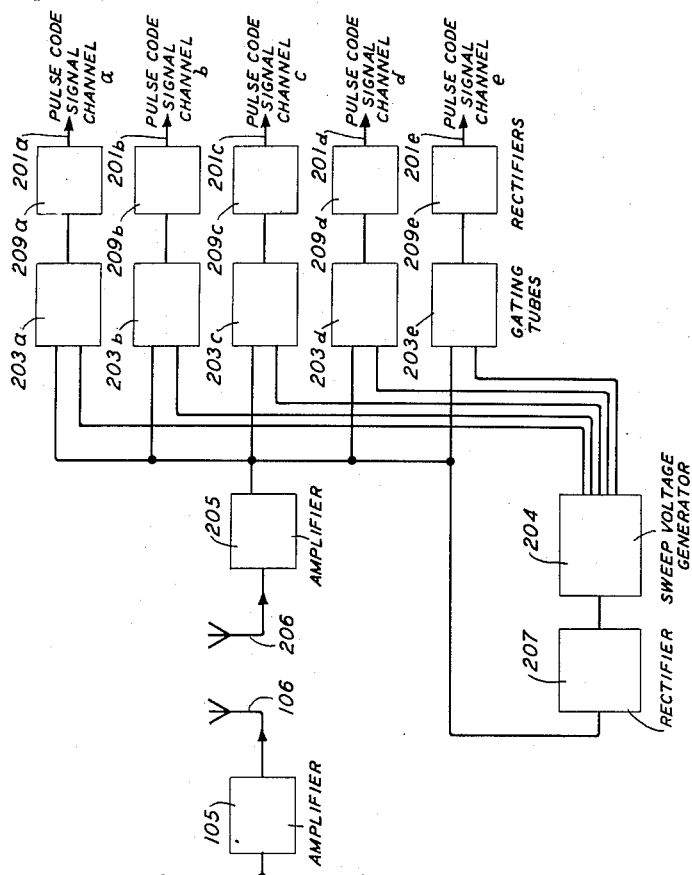
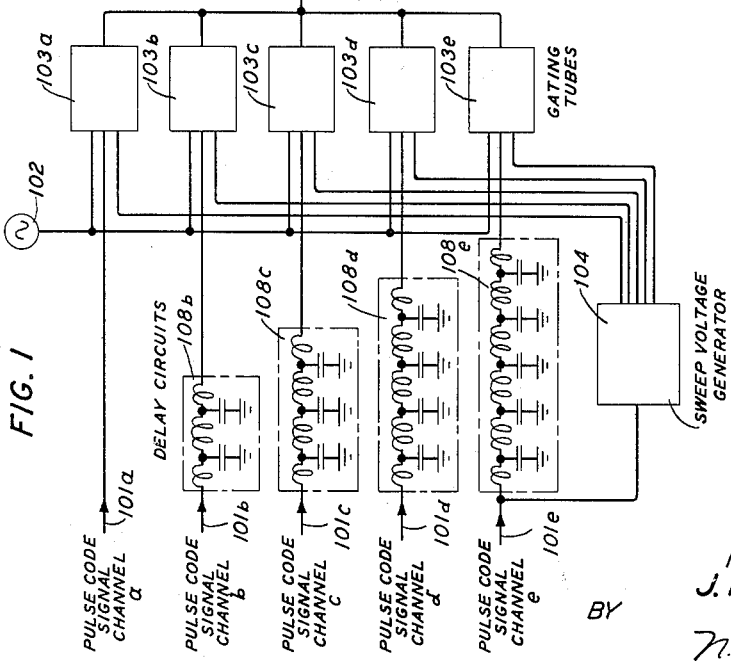
INVENTOR
J. R. PIERCE
BY
N. S. Ewing
ATTORNEY Sept. 27, 1955      J. R. PIERCE      2,719,187

HIGH FREQUENCY PULSE TRANSMISSION

Filed Aug. 17, 1949      9 Sheets-Sheet 2

INVENTOR
J. R. PIERCE
BY
N. D. Ewing
ATTORNEY

Sept. 27, 1955 J. R. PIERCE 2,719,187
HIGH FREQUENCY PULSE TRANSMISSION
Filed Aug. 17, 1949 9 Sheets-Sheet 3
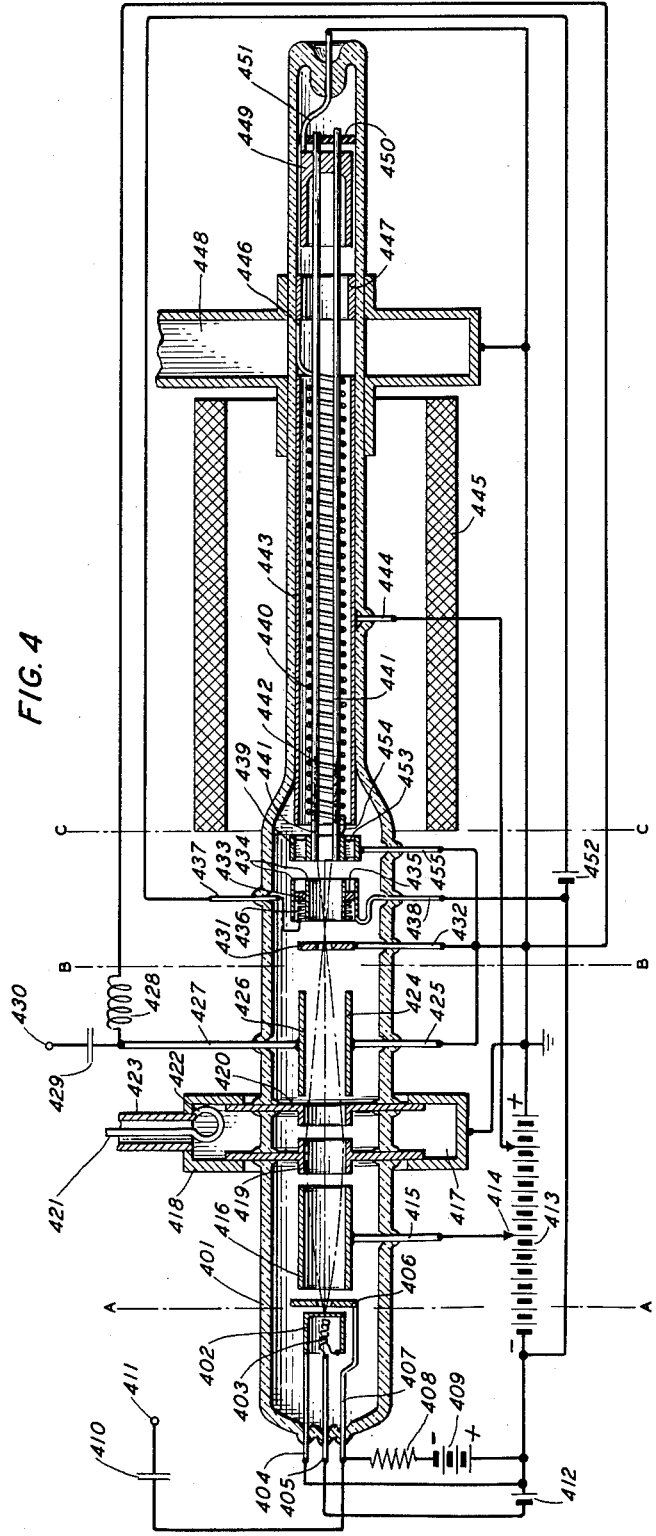
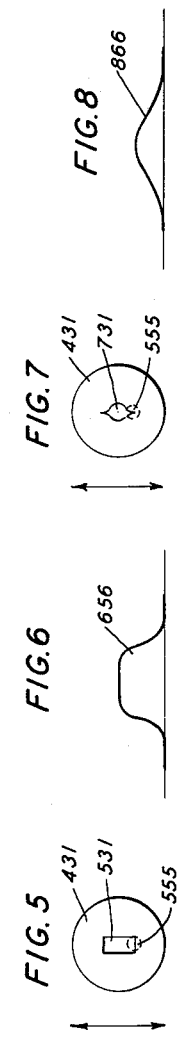
INVENTOR
J. R. PIERCE
BY
ATTORNEY Sept. 27, 1955   J. R. PIERCE   2,719,187
HIGH FREQUENCY PULSE TRANSMISSION
Filed Aug. 17, 1949   9 Sheets-Sheet 4

INVENTOR
J. R. PIERCE
BY
N. D. Ewing
ATTORNEY

Sept. 27, 1955 J. R. PIERCE 2,719,187
HIGH FREQUENCY PULSE TRANSMISSION
Filed Aug. 17, 1949 9 Sheets-Sheet 5

INVENTOR
J. R. PIERCE
BY
N. S. Ewing
ATTORNEY

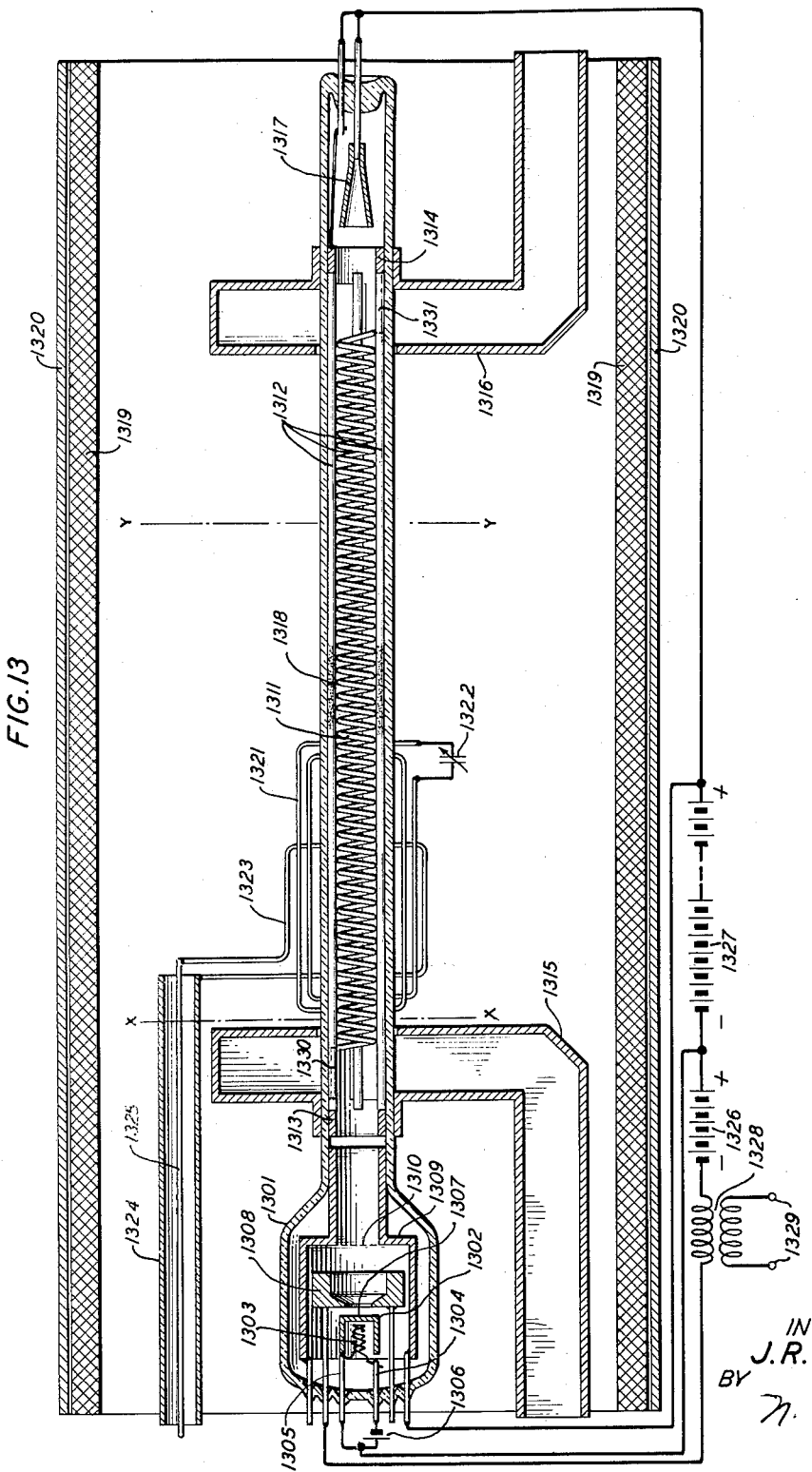

Sept. 27, 1955  J. R. PIERCE  2,719,187
HIGH FREQUENCY PULSE TRANSMISSION
Filed Aug. 17, 1949  9 Sheets-Sheet 7
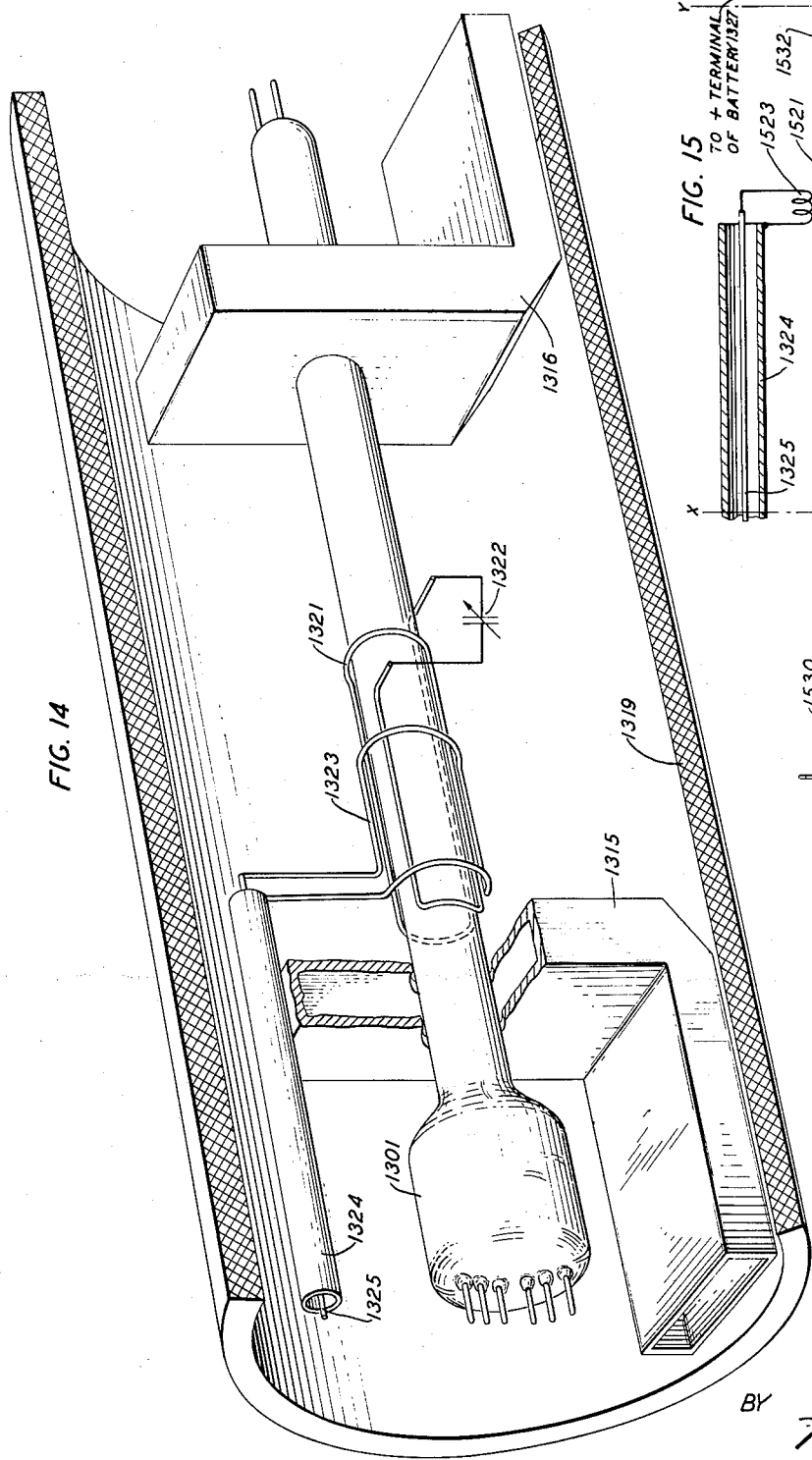
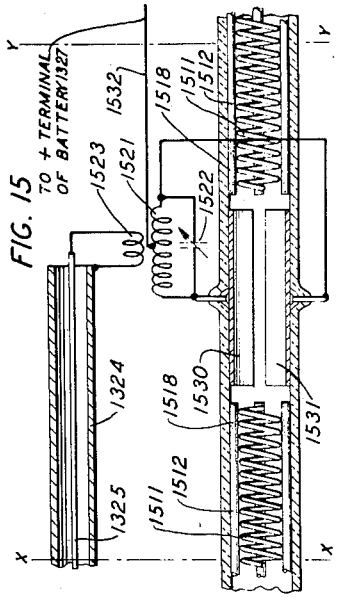
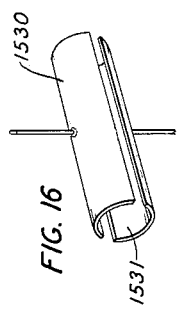
INVENTOR
J. R. PIERCE
BY
N. D. Ewing
ATTORNEY

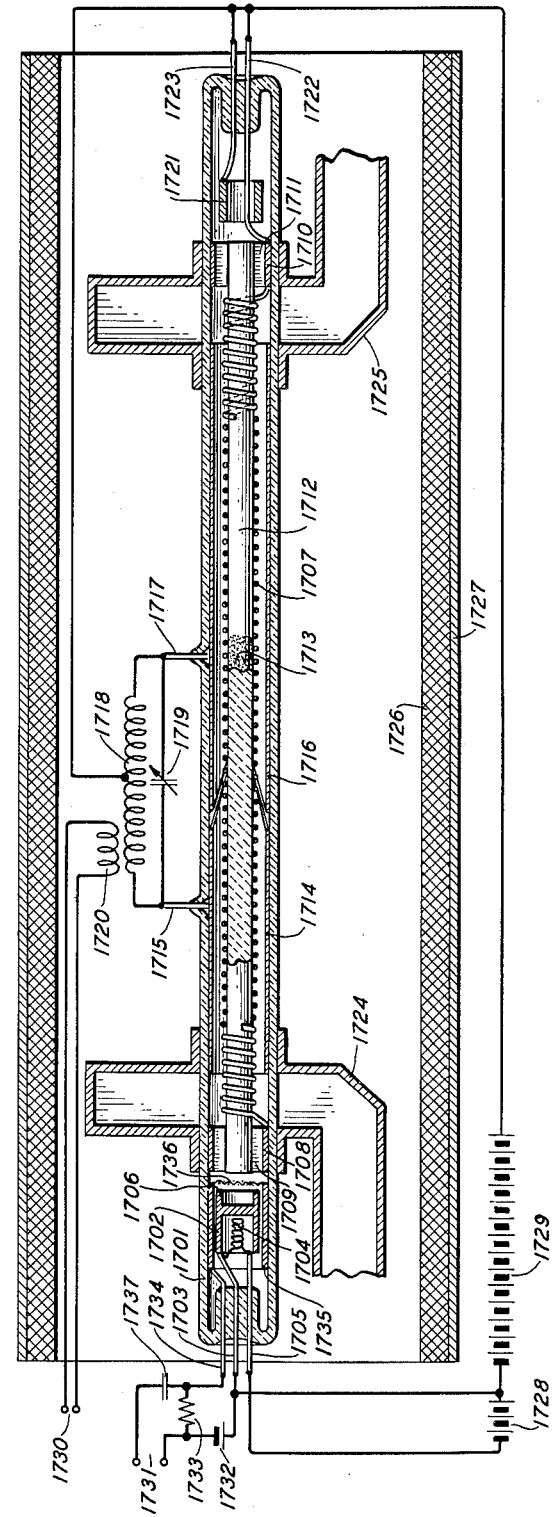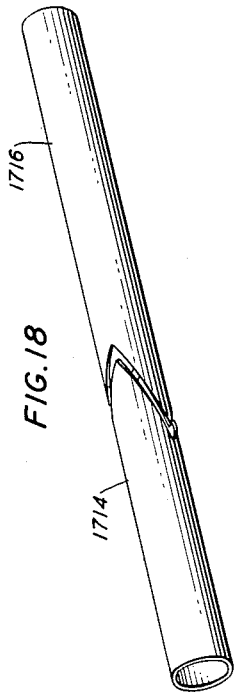

Sept. 27, 1955  J. R. PIERCE  2,719,187
HIGH FREQUENCY PULSE TRANSMISSION
Filed Aug. 17, 1949  9 Sheets-Sheet 9

INVENTOR
J. R. PIERCE
BY
N. A. Ewing
ATTORNEY

United States Patent Office 2,719,187
Patented Sept. 27, 1955

2,719,187

HIGH FREQUENCY PULSE TRANSMISSION

John R. Pierce, Millburn, N. J., assignor to Bell Telephone Laboratories, Incorporated, New York, N. Y., a corporation of New York Application August 17, 1949, Serial No. 110,851

21 Claims. (Cl. 179—15)

This invention relates to pulse systems of communication employing pulse code modulation signals in which complex wave forms are transmitted by code groups of pulses transmitted at rapidly recurring instants of time and to elements of such systems, particularly such systems employing very high frequencies and very short pulses.

An object of the invention is to provide such a system and apparatus capable of utilizing wavelengths in the millimeter range and pulse lengths from perhaps 1/100 to 1/1000 of a microsecond.

Another object is to provide such a system in which code pulses may be very closely spaced and thus may be transmitted in a very short length of time.

Another object is to provide means for combining the signals of several pulse code modulation coding circuits, each of which produces relatively long pulses, with a low repetition rate, into one pulse code modulation channel using short pulses and a high repetition rate.

The requirements of wide band circuits and amplification at very high frequencies are met by the use of traveling wave type tubes and a tube of that type is used to produce the closely spaced pulses.

The invention is explained more fully in the following description and the accompanying drawings, in which:

Figs. 1 and 2 are block schematics of a multichannel pulse code modulation system according to the invention, transmitter and receiver respectively;

Fig. 4 illustrates the construction and circuit of a helix type of traveling wave gating tube for producing the very short high-frequency pulses;

Fig. 5 shows a form of aperture which may be used in the tube of Fig. 4;

Fig. 6 shows the shape of the pulse resulting from the use of the Fig. 5 aperture;

Fig. 7 shows an aperture alternative to the Fig. 5 aperture;

Fig. 8 shows the shape of the pulse resulting from the use of the Fig. 7 aperture;

Figs. 13 and 14 illustrate a structure for much the same purpose as that of Fig. 4 but in which magnetic deflection of the electron stream is employed;

Figs. 15 and 16 show a modification of the tube of Fig. 13 in which electric rather than magnetic deflection is employed;

Figs. 17 and 18 illustrate another tube for much the same purpose as that of Fig. 4 but utilizing two interleaved metallic sleeves to produce deflection of the electron stream;

Figure 3:
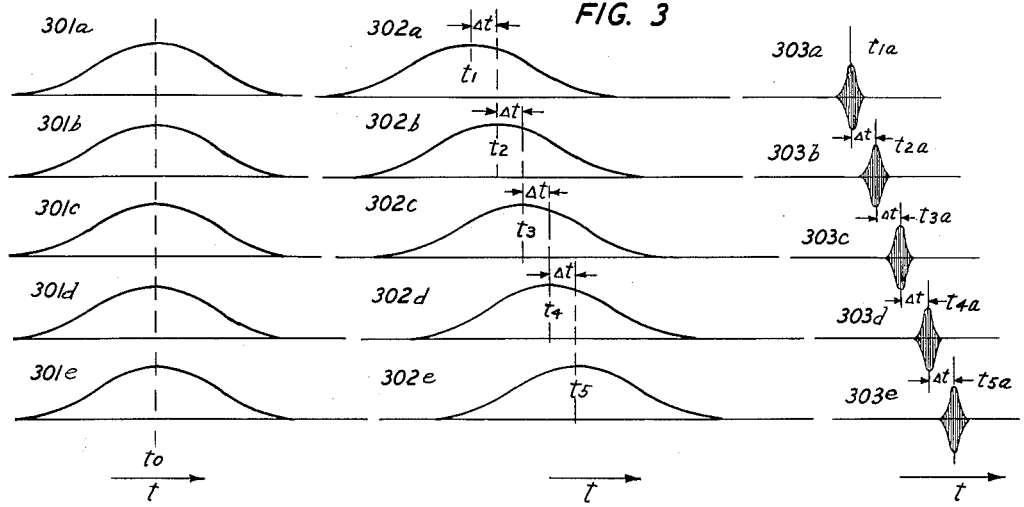
Fig. 3 is a diagram used in explaining the production of the transmitted pulses.

Fig. 1 shows a multichannel pulse code modulation transmitter according to the invention. This transmitter functions to combine the signals of several pulse code modulation coding circuits, each of which produces relatively long pulses with a low repetition rate, into one channel using short pulses and a high repetition rate. For example, the outputs of five pulse code modulation circuits or channels derived from five separate coders may be connected one to each of the leads $101a$–$101e$, the channels being distinguished by the letters $a$, $b$, $c$, $d$, and $e$. While five channels are shown in the system illustrated, the number may be either more or less. It is assumed that the pulses and spaces from these channels through means included in the coding circuits are received in synchronism as shown to the left in Fig. 3. Here at $301a$–$301e$ are typical pulses applied to the leads $101a$–$101e$, each of which is centered around a time $t_0$. In Fig. 1 the pulses applied to lead $101a$ go directly to a gating tube $103a$. (Each of the gating tubes $103a$–$103e$, as will be described later, is arranged to produce at appropriate times a very short pulse when excited by a pulse supplied to it through one of the leads $101a$–$101e$.) The pulses from channel $b$ through lead $101b$ go through a single section delay circuit $108b$, producing a delay $\Delta t$, before going to gating tube $103b$. The pulses from channel $c$ through lead $101c$ go through a two-section delay circuit $108c$, producing a delay $2\Delta t$, before going to gating tube $103c$. The pulses through lead $101d$ go through a three-section delay circuit, producing a delay $3\Delta t$, before going to gating tube $103d$ and the pulses through lead $101e$ go through a four-section delay circuit, producing a delay $4\Delta t$, before going to gating tube $103e$. The delay circuits $108b$–$108e$ may consist of series inductances and shunt capacitances with terminating half-section inductances as shown in Fig. 1 or they may be of any other type providing the desired delays in transmission of the pulses. The delay time $\Delta t$ is preferably chosen so that the time spacing between pulses in the channels such as those connected to leads $101a$–$101e$ is the number of channels times $\Delta t$, or in the five-channel exemplary system of Fig. 1, $5\Delta t$. Thus, the effect of the delay circuits is to space the pulses applied to the gating tubes $103a$–$103e$ from the channels through the lines $101a$–$101e$ evenly in time but one-fifth of the repetition period apart, as shown in the center of Fig. 3. The pulses from the leads $101a$–$101e$ will still be unchanged in length, however, and may overlap as shown in the center of Fig. 3.

The long pulses from the channels attached to the leads $101a$–$101e$, properly delayed as indicated above, are applied to the modulator terminals of the gating tubes $103a$–$103e$ so that an output pulse from these tubes can occur only when an input pulse from leads $101a$–$101e$ is present. A radio frequency source 102 excites the inputs of the gating tubes $103a$–$103e$. A sweep voltage generator 104 applies beam deflecting voltages to the gating tubes. The position of the electron beam in these tubes determines their ability to transmit. The deflecting voltages applied from the generator 104 differ successively in phase so that the tube $103a$ is enabled to transmit for a brief interval at the center of the pulse position of channel *a*. Tube 103*b* is enabled to transmit for a brief interval at a time Δ*t* later at the center of the pulse position as delayed by the delay circuit 108*b*. Tube 103*c* is enabled to transmit at a time 2Δ*t* later than 103*a*, at the center of the pulse position as delayed by the delay circuit 108*c*. Similarly 103*d* and 103*e* are enabled to transmit at times 3Δ*t* and 4Δ*t* later, respectively, so that each of the tubes 103*a*–103*e* is enabled to transmit at the center of the pulses reaching it, the pulses to 103*b*–103*e* being delayed. The effect of the gating tubes 103*a*–103*e* is to change the long pulses reaching them as shown at the center of Fig. 3, designated 302*a*–302*e*, to short radio frequency pulses which do not greatly overlap as shown at the right of Fig. 3, designated 303*a*–303*e*. These pulses are then combined and form the input to a single radio frequency amplifier 105, which may be of a traveling wave or other suitable type, and the short radio frequency pulses which carry the information from the leads 101*a*–101*e* in a time division manner are radiated from the antenna 106.

In order to synchronize the sweep voltage generator 104, some source of synchronizing signal must be made available. In the showing of Fig. 1 it is assumed that this is done by reserving channel *e* not for conveying intelligence but for synchronization purposes. To this end, the signal applied to lead 101*e* is made to consist of alternate pulses and spaces, as, pulse, space, pulse, space, etc. Thus the signal has a frequency component corresponding to half the repetition rate or repetition frequency and this component is taken from lead 101*e* to sweep voltage generator 104 to maintain synchronism. Sweep voltages are supplied by the generator 104 to the gating tubes 103*a*–103*e* in different phase relations such as to permit pulses reaching these tubes at the various times as 302*a*–302*e*, Fig. 3 to be transmitted as 303*a*–303*e*, Fig. 3 to the amplifier 105.

Fig. 2 shows a multichannel receiver by means of which the short pulses transmitted by the circuit of Fig. 1 and representing a time division transmission of five separate pulse code modulation channels connected to leads 101*a*–101*e* may be sorted out into separate channels again. The radio frequency pulses are received by antenna 206 and amplified by radio frequency amplifier 205 which may be of a traveling wave or other suitable type. A portion of the output of this amplifier goes to rectifier 207. Because of the synchronizing signal sent by the channel connected to lead 101*e* of Fig. 1 there will be a frequency component in the output of the rectifier of half the repetition rate of the pulses applied to any one of the channels connected to leads 101*a*–101*e* of the transmitter. The output of the rectifier is applied to a sweep voltage generator 204. This sweep generator is similar to the sweep generator 104 of Fig. 1 and its output is applied to the sweep terminals of gating tubes 203*a*–203*e* to deflect the electron beams. The deflecting voltages applied by this sweep generator differ successively in phase and by the above-mentioned synchronizing signal are kept in phase with the transmitted pulses. The gating tubes 203*a*–203*e* are therefore in turn enabled to pass received pulses transmitted on their respective channels. The radio frequency input to the gating tubes 203*a*–203*e* consists of the received radio frequency pulses and is supplied from the amplifier 205. The short radio frequency pulses 303*a*–303*e* illustrated to the right in Fig. 3 indicate the type of the input to the gating tubes 203*a*–203*e*. Of the series of these pulses, if the first can pass through tube 203*a* and not through any of the other tubes 203*b*–203*e*, because the electron beam is allowed to go through only one of these tubes at a time, then this first pulse can produce an output only from tube 203*a*. Similarly a pulse in the following position can produce an output only from tube 203*b*, the next from tube 203*c*, the next from 203*d*, the next from 203*e* and the following from 203*a* again. Even if a given tube of the series 203*a*–203*e* is in a state to produce a pulse in its output because of the near-zero value of the instantaneous sweep voltage produced by the sweep generator 204 allowing the electron beam to go through, it will not produce an output pulse unless it is supplied at the same time with a radio frequency pulse input from the antenna 206 by way of amplifier 205. Thus because of the gating only every fifth pulse can produce output from any one tube, such as 203*a*, and there will be output only if this particular pulse is present rather than absent. The outputs from the tubes 203*a*–203*e* are in the form of short radio frequency pulses. These pulses are rectified by the rectifiers 209*a*–209*e* which include filters for broadening the pulses. If it were not for the filter the output pulses would have the appearance shown at the right on Fig. 3, but after passing through the filter they have the appearance shown at the center of Fig. 3.

Thus there is delivered at the terminal leads 201*a*–201*e* of the receiver the pulse code modulation signals of the five channels applied to the leads 101*a*–101*e* respectively of the transmitter.

Descriptions of elements of the system indicated in block form in Figs. 1 and 2 follow:

A preferred embodiment of the gating tube (103*a*–103*e* in Fig. 1 and 203*a*–203*e* in Fig. 2) is shown in Fig. 4. This is a traveling wave type of tube. In this figure, 401 is an evacuated envelope which may be of glass or other suitable material. 402 is a thermionic cathode coated, on the central portion of the flat surface facing to the right, with emissive material which is heated by a coiled heater 403. The cathode 402 is connected to lead 404 which is sealed through the envelope 401 in a vacuum tight manner. One end of the heater 403 is connected to the cathode 402 and the other is brought out through the envelope 401 by means of lead 405. Battery 412 supplies current to the heater which, in turn, heats the cathode. The electron current flow from the cathode is controlled and focused by modulating electrode 406 which is connected to lead 407. The battery 409 is used to adjust the mean current flow. The voltage from the battery 409 is applied to the modulating electrode 406 through a resistance 408 to allow the application of a pulse or other signal from input terminal 411 through capacitor 410 to modulating electrode 406. The electron stream is accelerated by tubular electrode 416 which is supported from the envelope by lead 415 and which is held positive with respect to the cathode by a voltage tapped at 414 from battery 413. Electrode 419 which is held positive with respect to the cathode 402 and also with respect to electrode 416 cooperates with electrode 416 in forming an electron lens in the gap between electrodes 419 and 416. Tap 414 on battery 413 is adjusted to focus the electron stream, or beam, on a small central aperture in electrode 431. Electrodes 419 and 420, which are supplied with a direct-current potential by battery 413 are connected by member 418 to form an axially symmetrical cavity resonator 417. A radio frequency input applied to the coaxial line formed by conductors 421 and 423 is introduced into this resonator by coupling loop 422 and excites the resonator producing a radio frequency voltage between the opposed tubular portions of electrodes 419 and 420. This voltage serves to velocity modulate the electron beam passing through the center of the resonant cavity 417. The electron beam may be deflected in the region between electrodes 420 and 431 by means of two deflecting plates 424 and 426. One of these, 424, is connected by means of lead 425 to the positive pole of battery 413. The other, 426, is connected by means of lead 427 to the same positive pole of battery 413 through a choke coil or impedance 428 so as to allow a deflecting voltage applied to terminal 430 through capacitor 429 to excite deflecting plate 426. Electrode 431 is connected to the positive pole of battery 413 through lead 432. 433 is a thermionic cathode which is heated by a coiled heater 436. One side of the heater 436 is connected to the cathode 433 and to one pole of battery 452 through lead 438. The other side of the heater is connected to the other pole of battery 452 through lead 437 so that battery 452 supplies power to the heater 436. Cathode 433 has an emissive coating 435 in the form of a ring on its surface opposite the heater 436. On both the outside and the inside of the ring there are projecting edges 434 which serve to focus and concentrate the electron flow from the emissive coating located in the annular cup between these edges. Cathode 433 is connected to the negative pole of battery 413 by means of lead 438. An accelerating electrode 439 is connected to the positive pole of battery 413 through lead 455 and serves to accelerate the electrons from cathode 433. Electrode 439 consists of two short coaxial cylinders tied together by one or more radial fins 453. 440 is a helix wound of such pitch that as a transmission line it has a phase velocity at the frequency impressed upon the coaxial lines 421 and 423 substantially equal to the velocity of the electrons from cathodes 402 and 433. The helix is supported by two or more ceramic rods 441 which rest at one end in the electrode 439 and at the other end in holes in a supporting insulating washer 450. An one end the helix is terminated electrically in its characteristic impedance by means of loss material 442, capable of absorbing energy from a high frequency field, sprayed or evaporated onto the ceramic rods. At this same end the helix is connected to the electrode 439 by means of a connection 454 and so is at the potential of the positive pole of battery 413. At the other end the wire forming the helix is straightened out parallel to the axis of the tube in a straight section 446 and connected to member 447 which rests against the inside of the glass envelope 401 and by-passes the termination 446 of the helix through the envelope to the metal wall of the wave guide 448. The straight wire passes through the output wave guide 448 in such a manner as to match the impedance of the helix to the characteristic impedance of the wave guide so that any electromagnetic energy traveling to the right along the helix is completely radiated into the wave guide. Electrons from cathode 402 pass into the interior of the helix 440 at the left-hand end. Electrons from cathode 433 pass between the helix 440 and a thin cylindrical metal conductor 443 which is supported on the inside wall of the envelope 401 and is connected through lead 444 to the battery 413. As is indicated in Fig. 4 this lead 444 may be connected to the battery 413 to apply a voltage to the cylinder 443 which is lower than the voltage applied to the helix 440 so that positive ions in the electron stream which may contribute to noise may be removed and collected by the cylinder. The electrons from cathode 433 are finally collected on electrode 449 which is connected by means of lead 451 to the positive pole of battery 413. The field of a solenoid 445 is used to confine and focus the electron stream from cathode 433 so that a substantial portion of it passes between electrode 443 and helix 440 and reaches collector 449.

In operation the radio frequency voltage impressed on the coaxial line consisting of conductors 421 and 423 will excite a signal in the helix 440 if the modulator electrode 406 is at such a potential as to allow the emission of the electrons from the cathode 402 and if the voltage between the deflecting plates 424 and 426 is sufficiently low to allow any electrons emitted to pass through the aperture in electrode 431. As the tube is ordinarily used, a sinusoidal sweep voltage will be applied between the deflecting plates 424 and 426 so that electrons can pass through the aperture in electrode 431 twice each cycle, when the sweep voltage is rising or falling through zero. Thus, at these times when the voltage is near zero, the left end of the helix 440 can be excited by short radio frequency pulses or signals applied through the coaxial line 421, 423. Whether or not the helix will be excited at a time near zero of the deflecting voltage depends on the signal impressed on the modulator electrode 406 through terminal 411 at that time, because this signal controls the electron current flow from cathode 402 and determines whether or not an electron beam from that cathode is present. When the helix is excited by the radio frequency component of the electron beam passing through the aperture in electrode 431 this excitation increases in amplitude along the helix because of the traveling wave gain due to the interaction of the electrons from cathode 433 and the electromagnetic field of the helix, so that a much amplified radio frequency signal is radiated into the wave guide 448.

The shape of the radio frequency output pulse produced when the electron beam from cathode 402 is swept or deflected past the aperture in electrode 431 can be controlled by controlling the shape of that aperture. In Fig. 5 electrode 431 is shown looking along the axis of the tube. The arrow shows the directions of sweep. In Fig. 5 the aperture 531 is rectangular and long compared with the diameter of the electron beam 555 so that a roughly rectangular pulse 656 as shown in Fig. 6 will be produced. In Fig. 7 a different shaped aperture 731 is shown, which will produce a broad smooth pulse 866 as shown in Fig. 8. Other pulse shapes can easily be obtained.

This embodiment (Fig. 4) of the gating tube is utilized in the transmitting system of Fig. 1 by connecting one in at each of the positions 103a, 103b, 103c, 103d and 103e as follows: The radio frequency input coaxial lines 421, 423 are connected to receive energy from the radio frequency source 102 in Fig. 1. The modulator electrode input terminals 411 and a ground connection are connected to receive pulse signals from the several signal channels, the tube at 103a from lead 101a and the others from the delay circuits 108b–108e of the other channels. The deflecting plate terminals 430 and a ground connection are connected to receive energy from the sweep generator 104 in the proper phases for the respective channels. The output wave guides 448 are connected to deliver energy to the amplifier 105 and thence to the transmitting antenna 106. Thus, when the sweep voltage generator 104 positions the electron beams to pass through the aperture in electrode 431 of Fig. 4 at the times required by the different signal channels a pulse of radio frequency energy from source 102 will be radiated from the antenna 106 whenever pulse signals are present in those channels.

When the tube shown in Fig. 4 is utilized in the receiving system of Fig. 2, one is connected in at each of the positions 203a, 203b, 203c, 203d and 203e as follows: The radio frequency input coaxial lines 421, 423 are connected to the output of the amplifier 205 to receive the incoming radio frequency pulses from the antenna 206. The modulator electrode input terminals 411 are not used, the electrode serving only to adjust and focus the electron current flow from the cathode. The deflecting plate terminals 430 and a ground connection are connected to receive energy from the sweep generator 204 in the proper phase for the respective channels. The output wave guides 448 are connected to deliver energy to the rectifiers 209a–209e. Thus, the incoming pulses passing through amplifier 205 are applied to the inputs of all of the gating tubes 203a–203e and as the sweep voltage generator 204 positions the electron beams to pass through the respective apertures in electrodes 431 of Fig. 4 at the respective times when pulses may be sent from the various channels at the transmitter, each incoming pulse passes through only the gating tube in its channel (203a, 203b, 203c, 203d or 203e) and to a rectifier (201a, 201b, 201c, 201d or 201e).

Figure 9:
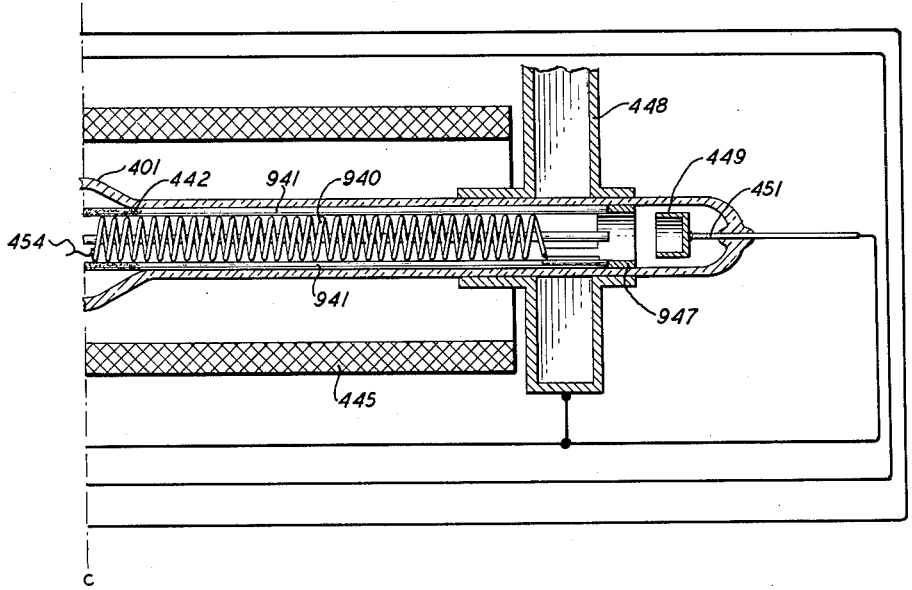
Fig. 9 shows as an alternative the use of a larger diameter helix in the tube of Fig. 4.

Fig. 9 shows a modification of a part of the tube shown in Fig. 4. In Fig. 4 the portion to the right of the vertical broken line C—C may be replaced by the portion shown in Fig. 9. In that case, the small helix 440 of Fig. 4 is replaced by a larger helix 940 of Fig. 9 and the electrons from both cathode 402 and cathode 433 pass inside of the helix. In Fig. 9 the supporting rods 941 are outside of the helix 940 between the helix and the envelope 401. The loss material 442 is sprayed or evaporated on the rods near the left end of the helix as in Fig. 4.

Figure 10:
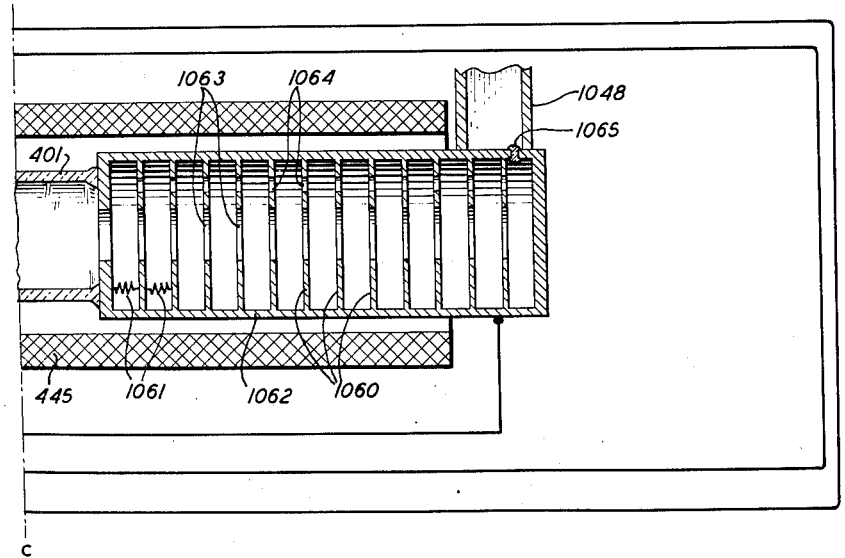
Fig. 10 shows as an alternative to the helix of Fig. 4 the use of a wave-guide type of structure.

Fig. 10 shows another possible modification of the portion of the tube of Fig. 4 to the right of the vertical broken line C—C. In this modification a traveling wave circuit other than a helix is used. This circuit consists of a number of apertured discs 1060 spaced evenly in a metal tube 1062 so as to form a loaded wave guide or a wave-guide filter network with a phase velocity at the radio frequency employed substantially equal to the velocity of the electrons. The discs 1060 may have large center apertures 1063 through which both electron streams pass and small apertures 1064 providing coupling between the resonant spaces between the discs for the purpose of controlling the phase velocity of the structure. The structure is terminated in its characteristic impedance at the left-hand or input end, by means of resistive elements 1061 shunting the resonant spaces between the discs. At the right the structure is coupled to a wave guide 1048 by means of a glass sealed window 1065 which allows radio frequency power to flow into the wave guide but provides a vacuum tight seal. The whole structure is sealed to the glass envelope 401 at the left in a vacuum tight manner. The output wave guide designated 1048 functions the same as the output wave guide 448 of Fig. 4.

Figure 11:
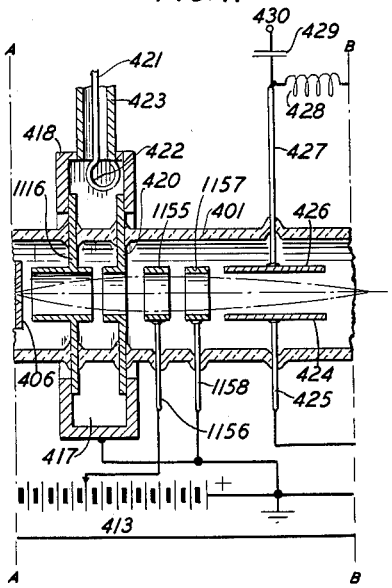
Fig. 11 shows a modification of the structure of Fig. 4 in which the electron lens acts on the electron stream farther along on its path.

Fig. 11 shows a modification of the structure of Fig. 4 in which the electron lens acts on the electron stream from cathode 402 after it has passed through the resonator by which it may be velocity modulated. The showing of Fig. 11 may be substituted for the portion of Fig. 4 between the two vertical broken lines A—A and B—B. In Fig. 11 the electron lens is formed by elements 420, 1155 and 1157 and, as will be seen, acts on the electron stream after it has passed through the resonator 417 formed by attaching the structure 418 between the disc electrodes 1116 and 420, the same as it is attached to electrodes 419 and 420 in Fig. 4. In Fig. 11 the electrodes 1116, 420 and 1157 are connected to the positive pole of battery 413, the last by means of lead 1158, and element 1155 is connected through lead 1156 to an intermediate point on battery 413, this intermediate point being chosen so as to focus the electron beam from cathode 402 on the aperture in the disc 431 of Fig. 4. The disposition of the deflecting plates 424 and 426 and of their leads 425 and 427 is shown in relation to elements 1116, 420, 1155 and 1157 in Fig. 11 for clarity.

Figure 12:
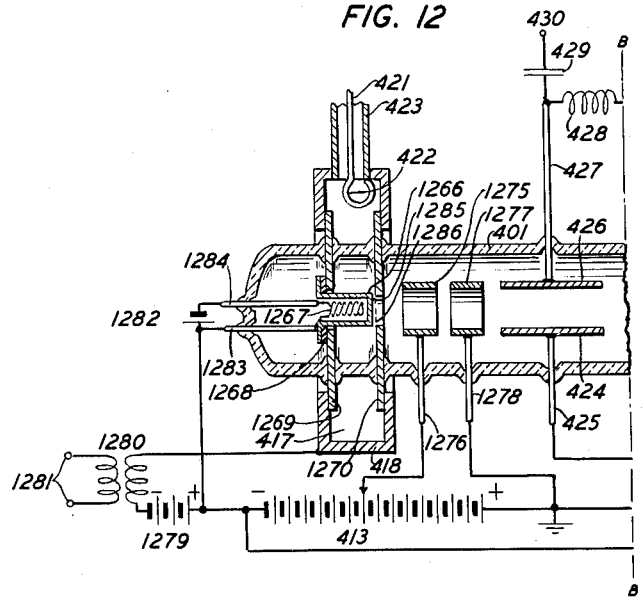
Fig. 12 shows a modification of the structure of Fig. 4 in which the high frequency control of the electron stream is had by means of a control grid adjacent to the cathode.

In Fig. 12 is shown a modification of Fig. 4 which may be substituted for the portion of Fig. 4 to the left of the vertical broken line B—B and in which the radio frequency signal is impressed on the electron stream which corresponds to that from cathode 402 in Fig. 4 by opposing a control grid 1286 to an emmisively coated cathode 1266 in the cavity resonator 417. By this means the field of the resonator may directly produce density modulation of the electron stream rather than velocity modulation as in the drawings of Figs. 4, 9, 10 and 11. The space between the surface of the cathode 1285 which is coated with the emissive coating and the control grid 1286 should be small for best results. The cathode 1266 is heated by the coiled heater 1267. One end of the heater is connected to the cathode and the cathode connection is brought out through the envelope 401 by lead 1283. The other end of the coiled heater is brought out of the envelope on lead 1284 and a battery 1282 is connected between leads 1283 and 1284 to heat the cathode. The cathode structure is by-passed for radio frequencies to disc 1269 which is separated from a flange on the cathode by a thin mica, ceramic or other insulating sheet 1268. Disc 1270 which bears the control grid 1286 and disc 1269 are interconnected by the structure 418 so as to form a cavity resonator 417 which is resonant to the input radio frequency. This resonator is excited by the coupling loop 422 connected to the radio frequency input by the coaxial line 421–423. When the resonator is excited, a radio frequency voltage appears between the cathode surface 1285 and the grid 1286 and serves to impress a radio frequency signal on any electron stream emitted from the cathode surface 1285. Whether or not electrons are emitted from the cathode surface 1285 can be determined by a biasing voltage applied between the cathode 1266 and the grid 1286 by means of battery 1279 and by pulses or other signals impressed between cathode 1266 and grid 1286 by means of transformer 1280. Such pulsed signals may be applied to control terminals 1281. These terminals function the same as terminals 411 and ground in Fig. 4. The electrons emitted from the cathode surface 1285 may be focused on the aperture of electrode 431 of Fig. 4 by means of two tubular electrodes 1275 and 1277. The focusing tube 1275 is connected to a mid-point of battery 413 by means of lead 1276 and focusing tube 1277 is connected to the positive pole of battery 413 by means of lead 1278. For clarity the deflecting plates 424 and 426, their leads, terminal 430 and elements 428 and 429 described with Fig. 4 are shown.

Figs. 13 and 14 show another sturcture for accomplishing much the same purpose as that accomplished by the tube shown in Fig. 4 and the modifications of that tube shown in Figs. 9, 10, 11 and 12. In Fig. 13, 1301 is the glass envelope of a traveling wave amplifier tube. 1302 is a cathode electrode with a face 1307 coated with electron emissive material. 1303 is a coiled heater which at one end is connected to the cathode 1302 and at the other end by means of lead 1304 to one pole of the battery 1306. The other heater lead is connected through the cathode lead 1305 to the other pole of the battery 1306 so that the cathode may be heated and emit electrons from the face 1307. 1308 is a modulator and focusing electrode which is biased with respect to the cathode by battery 1326 and upon which a control voltage from control terminals 1329 may be applied through transformer 1328. Thus, electrons may be made to flow or not to flow in accordance with the control voltage applied to terminals 1329. These terminals function the same as terminal 411 and ground in Fig. 4. 1309 is an accelerating and focusing electrode which is held positive with respect to cathode 1302 by means of battery 1327. Electrons accelerated from the cathode by this electrode pass through grid 1310 and through the open center of the tube and are finally collected on electrode 1317 which is connected to the positive pole of battery 1327. An input radio frequency is applied to the wave guide 1315 (the same as applied to coaxial line 421, 423 of Fig. 4) and by means of the stub 1330 on member 1313 connected to the end of the helix the signal is transferred to the helix 1311. The stub 1330 crosses the wave guide and couples to it. The cylindrical member 1313 fits inside the glass envelope and with the metal flange of wave guide 1315 forms a by-pass condenser. The pitch of the helix is so chosen that the phase velocity of the wave traveling along the helix is substantially equal to the velocity given to the electrons by battery 1327. In the space between the wave guide 1315 and the center of the helix length at 1318 the electrons interact with the radio frequency field of the helix so as to produce an increasing modulation of the velocity and density of the electron stream as it travels through the helix. Loss material 1318 deposited near the center of the helix length on the ceramic rods 1312 which support the helix absorbs most of the electromagnetic part of the wave traveling to the right along the helix. The bunched, or density-modulated, electron stream, however, excites an increasing wave in the right-hand part of the helix, beyond 1318, and this radio frequency signal is amplified in traveling along the helix and is radiated into the output wave guide 1316 (which corresponds to the output wave guide 448 of Fig. 4) by means of the coupling stub 1331 on member 1314 which is connected to the end of the helix and extends across the wave guide. Member 1314 forms part of a by-pass condenser as does 1313.

A solenoid 1319 supplied by a suitable direct-current source may be used to focus and confine the electron stream. It may be advantageous to use a magnetic shield 1320 around the solenoid. A coil 1321 is disposed so as to produce a magnetic field transverse to the axis of the helix and to the magnetic field produced by the solenoid 1319. The inductance of the coil 1321 is resonated by the capacitance of condenser 1322. The coil 1321 is excited by a radio frequency sweep signal applied to the coaxial line consisting of inner and outer conductors 1325 and 1324 respectively which correspond to terminal 430 and ground of Fig. 4. These conductors lead to a coupling coil 1323 which has mutual inductance with the sweep coil 1321. Thus a sinusoidal signal applied to the coaxial line 1324, 1325 will cause a strong sinusoidal magnetic field in coil 1321 which will have a strong deflecting action on any electrons emitted from cathode 1302, so that electrons can pass from the left or input end of the traveling wave tube into the right or output end of the traveling wave tube only at times when the magnetic field of coil 1321 is near zero. Thus if radio frequency is applied to wave guide 1315, radio frequency output will be observed in wave guide 1316 only for brief times when the sinusoidal field due to coil 1321 is near zero. Whether or not a pulse or signal appears in wave guide 1316 at these times depends upon the potential of the modulator electrode 1308 with respect to the cathode 1302 as determined by the biasing battery 1326 and the control signal applied to control terminals 1329.

Fig. 14 is a diagram in perspective to indicate more clearly the mechanical assembly of some of the parts of the tube of Fig. 13. The designations of the elements are the same as in Fig. 13.

Fig. 15 shows a modification of the tube shown in Figs. 13 and 14 in which electric rather than magnetic deflection of the electron beam is used. In this case the helix 1311 of Fig. 13 is broken near the center into two parts 1511 and each free end is terminated by resistive material 1518 deposited on the support rods at that place, the support rods also being broken into two parts 1512. Between these ends of the helix, which are drawn apart, two deflecting plates 1530 and 1531 are located. Between the deflecting plates 1530 and 1531 are connected an inductance 1521 and a capacitance 1522. A lead 1532 to the center of inductance 1521 is connected to the positive terminal of battery 1327 so that the deflecting plates will be at the same D.-C. potential as the helix. The sweep signal is applied to this resonant circuit, 1521, 1522, by means of a coupling coil 1523 which is connected to the coaxial line formed by conductors 1324 and 1325. Fig. 16 shows the shape of the deflecting plates 1530 and 1531.

Fig. 17 shows another tube to accomplish much the same purpose as the tubes shown in Figs. 4 and 13. In this figure, 1701 designates the evacuated glass envelope of a traveling wave amplifier type of tube. Electrons are emitted from the coated ring-shaped portion 1706 of the cathode 1702. The cathode 1702 is heated by a coil heater 1704 which is connected to the cathode at one end. The cathode is connected to lead 1703 and the free end of the heater is connected to lead 1705. A potential is applied across the heater by means of battery 1728 so as to heat the heater and cathode. A helix 1707 is wound on a ceramic rod 1712 with such a pitch as to have a phase velocity, at the frequency to be transmitted and amplified, substantially equal to the electron velocity which is produced by accelerating the electrons from cathode 1706 by battery 1729. The rod 1712 upon which the helix is wound is supported at the left end by radial metal fins 1709 connected to a metal sleeve 1708 which fits in and rests against the glass envelope 1701.

The rod 1712 is supported at the right end by radial metal fins 1711 connected to a metal sleeve 1710 which rests against the inside of the glass envelope 1701. The left end of the helix is connected to the metal sleeve 1708 which provides a by-pass through the glass wall of the envelope 1701 to the metal wall of the input wave guide 1724. The right end of the helix is connected to the metal sleeve 1710 which provides a by-pass to the metal wall of the output wave guide 1725. The helix is surrounded by thin metal tubes 1714 and 1716 which rest against the inside of the glass envelope 1701. These metal sleeves have interleaved portions as shown in Fig. 18. The break between the interleaved portions 1714 and 1716 is to the left of the center of the helix. Sleeve 1714 is connected by means of a lead 1715 to one end of an inductance 1718 and sleeve 1716 is connected by means of lead 1717 to the other end of inductance 1718. Inductance 1718 is resonated by condenser 1719 at the sweep frequency, and this resonant circuit, inductance 1718 and condenser 1719, is excited by a sweep signal applied to terminal 1730 which are connected to the coupling coil 1720. The helix 1707 is connected by means of lead 1722 to the positive pole of battery 1729 and a tap on inductance 1718 is connected to the positive pole of battery 1729 so as to maintain the sleeves 1714 and 1716 at the same mean potential as the helix 1707. The electron flow from the cathode 1706 is controlled by the modulating grid 1736 which is supported in front of the cathode by the metal sleeve 1735, this sleeve being supported by the tube envelope 1701. The grid is connected through the sleeve 1735 to the lead 1734, brought out through the tube envelope. The voltage from the biasing battery 1732 is applied to the grid 1736 through the resistor 1733 to allow the application of a pulse or other signal from input terminals 1731 through the capacitor 1737 to the modulating grid. Electrons are accelerated from the coated surface 1706 of the cathode by the electrode 1708 which is attached to the left end of the helix as shown, and thence to the positive pole of battery 1729. The tubular electron stream so formed is guided by a magnetic field, produced by solenoid 1726, through the annular space between the helix 1707 and metal sleeves 1714 and 1716 to the collector 1721, which is connected to battery 1729 through lead 1723. A magnetic shield 1727 may surround solenoid 1726. In operation radio frequency energy is applied to wave guide 1724. This is transferred to the left end of the helix 1707 where the helix passes across the wave guide to the connection to member 1708. The electron stream, which will be present if the modulating grid 1736 is at such a potential as to allow electrons to be emitted from the cathode 1706, interacts with the field of the helix to produce an increasing electromagnetic and space charge wave which travels along the tube to the right. Most of the electromagnetic portion of this wave is absorbed by the loss material 1713 sprayed or coated on the ceramic rod 1712 near the center of the helix. If no deflection voltage appears between the sleeves 1714 and 1716 a density modulated electron stream will pass this region of loss material 1713 and will induce a signal on the helix to the right of the loss material. This signal will be substantially amplified by the traveling wave amplifier action and will be radiated from the end of the helix into the output wave guide 1725. If, however, there is substantial voltage between electrodes 1714 and 1716, the electron stream will be intercepted by these electrodes and there will be no radio frequency output in the wave guide 1725. Thus, when a sufficiently strong sweep signal is applied to the sweep terminals 1730 and a radio frequency signal is applied to the input wave guide 1724, there may be a series of radio frequency pulses in the output wave guide 1725 occurring twice each cycle of the sweep frequency at times when the sweep voltage applied between electrodes 1714 and 1716 is near zero. Such radio frequency pulses will not, of course, be present if there is no radio frequency input signal to wave guide 1724, or, when connected into the transmitting system if there is no pulse signal applied to the terminals 1731 to permit an electron stream from the cathode. In connecting this tube into the transmitting system in place of the Fig. 4 showing, terminals 1731 correspond to terminals 411 and ground of Fig. 4, the terminals 1730 correspond to terminals 430 and ground of Fig. 4, the input wave guide 1724 corresponds to the input coaxial line 421, 423, of Fig. 4 and the output wave guide 1725 corresponds to the output wave guide 448 of Fig. 4.

Figs. 4, and 9 through 18 comprise the subject-matter of my co-pending application Serial No. 304,535, filed August 15, 1952.

Figure 21:
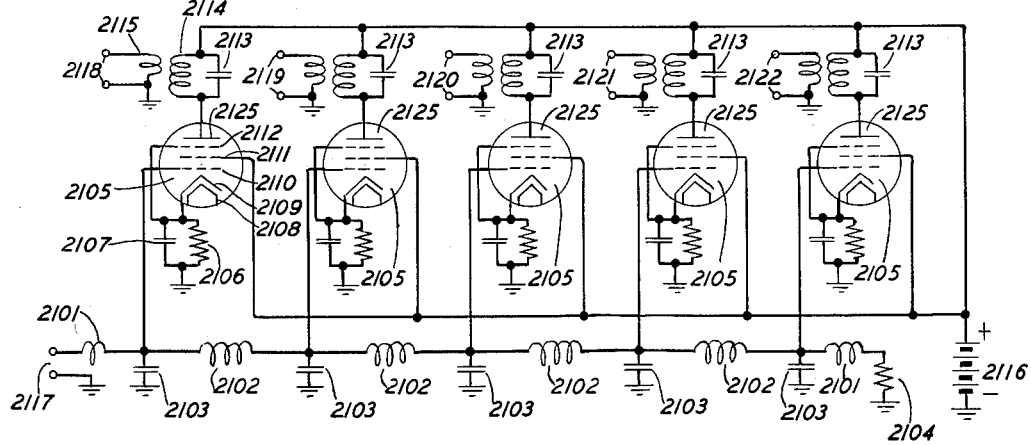
Fig. 21 shows the circuit of an amplifier and phase adjuster which together with the circuit of Fig. 20 provides several sweep or deflection voltages in different phase relations.
Figure 20:
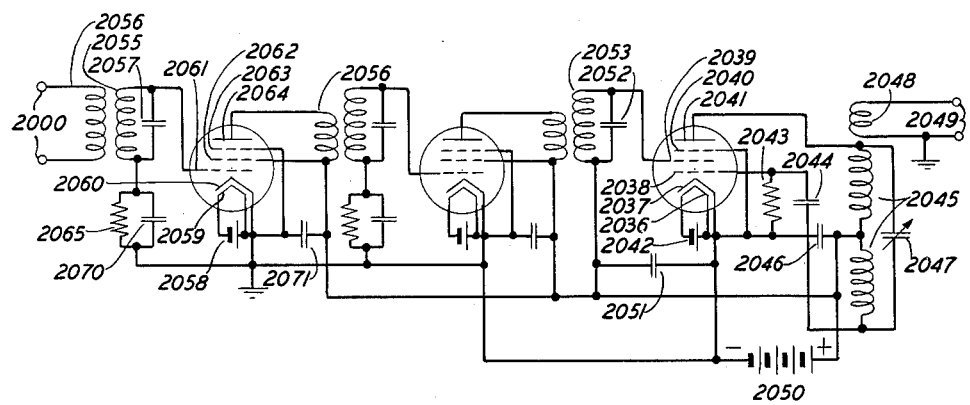
Fig. 20 shows the circuit of a sweep voltage generator.

Details of the sweep voltage generators 104 of Fig. 1 and 204 of Fig. 2, which are similar, are shown partly in Fig. 20 and partly in Fig. 21. In Fig. 20, the cathode 2037, heater 2036, control grid 2038, screen grid 2039, suppressor grid 2040 and plate 2041 are elements of a pentode connected in a Hartley oscillating circuit. Heater 2036 is heated by battery 2042. An inductance 2045 and a capacitance 2047 excite the plate 2041 directly and the grid 2043 through a grid condenser 2044 so as to produce oscillations. The grid potential is governed by grid leak resistance 2043. The center tap of inductance 2045 is by-passed to the cathode 2037 by a condenser 2046 and is connected to the positive pole of battery 2050. Energy is derived from the oscillator by an inductive coupling coil 2048 and is available at terminals 2049. The oscillator is maintained in synchronism with incoming pulse signals by a synchronizing signal applied to the screen grid 2039 by means of a resonant circuit consisting of an inductance 2053 and a capacitance 2052. The other side of this circuit is by-passed to the cathode 2037 by condenser 2051. The oscillator should be tuned as nearly as possible to half the desired repetition frequency by means, for instance, of condenser 2047, and a synchronizing frequency which bears an integral relation to half the repetition frequency, as for example, a synchronizing frequency equal to the repetition frequency or equal to one-fifth, or half, or twice the repetition frequency may be used. The synchronizing frequency will hold the output of the oscillator in a constant phase relation with the desired repetition frequency. The synchronizing frequency may be amplified by a two-stage amplifier before it is applied to inductance 2053. Such an amplifier is shown in the circuit of Fig. 20. The synchronizing frequency is applied to terminals 2000 and excites coil 2056. This in turn excites the resonant circuit consisting of inductance 2055 and capacitance 2057 which is connected on one end to grid 2061 and on the other end to ground through grid leak resistance 2065 and condenser 2070. The other terminals of the amplifier tube are cathode 2060 which is grounded, heater 2059 which is heated by battery 2058, screen grid 2062 which is by-passed to ground by condenser 2071 and is connected to the positive pole of battery 2050, suppressor grid 2063 connected to ground an plate 2064 connected to output coil 2056 in order to excite the next stage of the amplifier. The other side of the output coil 2056 is by-passed to ground by condenser 2071 and is also connected to the positive pole of battery 2050. The second stage of this amplifier for the synchronizing signal is similar to the first stage just described. In Fig. 20 it is obvious which elements of the second stage correspond to those of the first stage and function similarly so that designation numerals are omitted and no detailed description is deemed necessary. In Fig. 1 a synchronizing signal of half-repetition rate is made available from signal channel $e$ by means of the connection from lead 101e to sweep generator 104, channel $e$ being reserved for synchronizing purposes. The source of half-repetition frequency, lead 101e, is connected to a part of the sweep generator 104 in such a manner as to maintain the phase of the half-repetition frequency signal supplied to the gating tubes 103a—103e, as for example, to terminals 2000 in Fig. 20. In this case, the resonant circuits 2055, 2057 and 2053, 2052 should be tuned to half-repetition frequency. Further details of a possible construction to be used in the sweep voltage generator are shown in Fig. 21 (Figs. 20 and 21 together comprising the complete sweep generator circuit). A sinuosoidal sweep voltage, for example, that appearing at terminals 2049 of Fig. 20, is applied to terminals 2117 of Fig. 21. These are the input terminals of a delay line consisting of inductances 2102 and capacitances 2103 and terminating half-section inductances 2101 and a terminating resistance 2104. Sinusoidal voltages differing in phase by a time $$\frac{\Delta t}{2}$$

are applied from connections along the delay line to the grids 2110 of pentodes 2105. In Fig. 21 all of the tubes 2105 and the circuits attached thereto are obviously very similar and it is readily apparent which elements correspond in the five circuits. Corresponding elements are considered to have the same designations (except terminals 2118–2122) and complete duplication of designation numerals on the drawing is deemed unnecessary so that many are omitted in order to make the drawing more clear. In the following description the elements of the five parts of the circuit similarly designated are referred to together. The cathodes 2109 of these pentodes are connected to ground through biasing resistors 2106 and by-pass condensers 2107. The cathode heaters 2108 may be heated from a battery or other power source not shown. The suppressor grids 2112 are connected to the cathodes 2109 and the screen grids 2111 are connected to the positive pole of battery 2116, the negative pole of battery 2116 being grounded. The plates 2125 are connected to one side of the resonant circuits consisting of inductances 2114 and capacitances 2113, the other sides of the resonant circuits being connected to the positive pole of battery 2116. Voltages in various phases are obtained from the resonant circuits by means of coupling coils 2115 and are available at output terminals 2118, 2119, 2120, 2121 and 2122. For instance, these successive output terminals may be connected to the deflecting plate leads of gating tubes 103a–103e of Fig. 1 in order to successively position the electron beams in these tubes to permit the passing of pulse signals at the times required by the different channels.

This sweep voltage generator of Figs. 20 and 21 is utilized in the transmitting circuit of Fig. 1, where it is designated 104, by connecting terminals 2000 of Fig. 20 to lead 101e of Fig. 1, terminals 2049 of Fig. 20 are connected to terminals 2117 of Fig. 21 and terminals 2118, 2119, 2120, 2121 and 2122 of Fig. 21 are connected to the sweep terminals of the gating tubes 103a, 103b, 103c, 103d and 103e respectively of Fig. 1.

Figure 19:
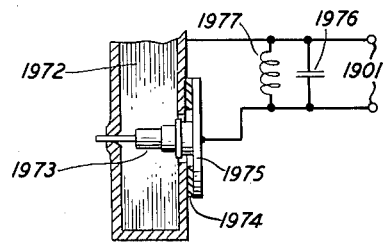
Fig. 19 shows a rectifier used with the sweep generator in the receiving system.

Fig. 19 shows details of a rectifier suitable for the rectifier 207 in Fig. 2 which is used with the sweep generator 204 in the receiving system of Fig. 2. In Fig. 19 a crystal rectifier 1973 is shunted across a wave guide 1972 approximately one-quarter wavelength from the closed end of the guide. A mounting element 1975 and a mica or other insulating washer 1974 provide a radio frequency by-pass capacitance between one side of the crystal rectifier and the wall of the wave guide. The rectified output appears at terminals 1901. These may be shunted by an inductance 1977 and a capacitance 1976 which, together with the by-pass capacitance of members 1972, 1974 and 1975 resonate at one-half repetition frequency and assure the desired sinusoidal output. This rectifier is used in the receiving system of Fig. 2, where it is designated 207, to transform the high frequency synchronizing signals from the output of the amplifier 205 into low frequency signals to control the sweep generator 204. The input wave guide 1972 is connected to the output of the amplifier 205 of Fig. 2 and the output terminals 1901 are connected to the input terminals of the sweep generator 204 (these would be the terminals 2000 of Fig. 20). The sweep generator 204 of Fig. 2 like 104 of Fig. 1 may consist of the combination of the showings of Figs. 20 and 21. Terminals 2049 of Fig. 20 are connected to terminals 2117 of Fig. 21 and terminals 2118, 2119, 2120, 2121 and 2122 of Fig. 21 are connected to the sweep terminals of the gating tubes 203a, 203b, 203c, 203d and 203e respectively of Fig. 2.

Figure 22:
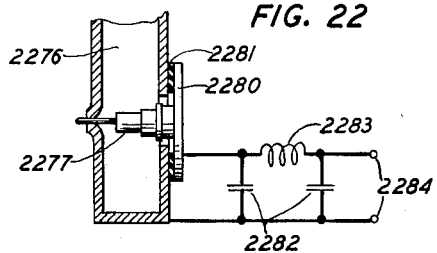
Fig. 22 shows an output rectifier used in the receiving system.

Fig. 22 shows details of a rectifier suitable for use for each of the rectifiers 201a–201e in Fig. 2. This rectifier is equipped with a filter for broadening the output pulse. The assembly consists of a wave guide 3276, a crystal 2277, a radio frequency by-pass condenser consisting of electrode 2280 and insulating washer 2281 and the output filter consisting of capacitances 2282 and inductance 2283. The rectified output pulse appears at terminals 2284. In the receiving system of Fig. 2 this rectifier is utilized at 209a, 209b, 209c, 209d and 209e. In each case, the input wave guide is connected to the output of the respective gating tube 203a–203e and the output pulses of the different channels are available at the output leads 201a–201e, each of which corresponds to the leads 2284 of Fig. 22.

Figs. 1 and 2 are single line diagrams, that is, interconnections are shown as single lines. These lines may denote a two-wire line, a coaxial line, a wave guide or whatever type of transmission circuit may be known in the art as being appropriate considering the type of energy to be transmitted and the apparatus to be connected to. It may be noted in the various embodiments illustrated that different types of terminals and transmission lines are shown. Proper methods of connecting such various types of lines are well known in the art.

What is claimed is:

1. An electrical pulse signal communication circuit comprising means for receiving from each of a plurality of signal channels electrical signal pulses of a given repetition frequency, the pulses in all of the channels being in phase, means associated with said receiving means for delaying by different amounts the pulses from the different channels, means connected to said receiving means for converting the said signal pulses into pulses of radio frequency energy and narrowing the pulse widths, means connected to said converting means for combining the said narrowed radio frequency pulses of all said channels into a single transmission circuit, the said means for delaying the pulses permitting the narrowed pulses from the different channels to be interleaved and transmitted in sequence along the single transmission circuit and at a pulse repetition frequency higher than the said repetition frequency in the said channels.

2. A signal transmission system comprising means for accepting from a plurality of signaling channels electrical signal pulses having a given pulse length and pulse repetition rate, a plurality of means connected to said accepting means for producing, as determined by said signal pulses, radio frequency signal pulses of shorter length and displaced in time in accordance with the different channel sources, means connected to said radio frequency pulse producing means for combining into a single transmission channel the radio frequency pulses derived from the pulurality of channels and transmitting them on said single channel at a repetition rate higher than said repetition rate of the pulses on the plurality of channels, means for receiving radio frequency electrical pulse signals on a single communication channel, the said signals received containing pulses originating from and destined for a plurality of communication channels and being distinguishable by their relative arrival times, a plurality of radio frequency pulse translating means each connected to said receiving means and between said receiving means and said destination channels and operatively connected to a synchronous sweep generator and means for maintaining said sweep generator in synchronism with said received pulses comprising a circuit connecting said sweep generator to said receiving means, whereby radio frequency signal pulses are received and distributed to the plurality of destination channels in accordance with their channels of origin.

3. A signal transmission system comprising means for accepting from a plurality of signaling channels electrical signal pulses having a given pulse length and pulse repetition rate, a plurality of means connected to said accepting means for producing as determined by said signal pulses, radio frequency signal pulses of shorter length and displaced in time in accordance with the different channel sources, said radio frequency signal pulse producing means being connected to a source of radio frequency energy for radio frequency excitation and to said signalling channels for controlling their radio frequency signal outputs, and means connected to said radio frequency pulse producing means for combining into a single transmission channel the radio frequency pulses derived from the plurality of channels and transmitting them on said single channel at a repetition rate higher than said repetition rate of the pulses on the plurality of channels.

4. A signal transmission system comprising means for receiving short radio frequency pulse signals on a single communication channel, said signals containing pulses originating from and destined for a plurality of communication channels and being distinguishable by their relative arrival times, a plurality of radio frequency pulse translating means adapted to be rendered operative or inoperative each connected to said receiving means and between said receiving means and said destination channels, means comprising a synchronous sweep generator connected to said plurality of translating means for rendering the translating means either operative or inoperative and means for maintaining said sweep generator in synchronism with said received pulses comprising a circuit connecting said sweep generator to said receiving means, whereby radio frequency signal pulses are received and distributed to the plurality of destination channels in accordance with their channels of origin.

5. A signal translating system comprising a plurality of means for producing short pulses of radio frequency energy when made operative at short intervals while energized by longer signal pulses, means connected to sources of said longer signal pulses for applying energizing pulses to said radio frequency pulse producing means in sequence, means connected to each said radio frequency pulse producing means for making it operative for a period shorter than the period of said longer signal pulses during the application of each said signal energizing pulse and means connected to said radio frequency pulse producing means for combining their pulse outputs and transmitting them in sequence on a single communication channel.

6. An information transmission system comprising means for receiving from each of a plurality of signal channels electrical pulse signals of a given pulse repetition frequency, the pulses in all of the channels being in phase, means associated with said receiving means for delaying by different amounts the pulses from the different channels, a plurality of means connected individually to said receiving means for converting the said pulses into pulses of radio frequency energy and narrowing the pulse widths, means connected to said converting means for combining the said radio frequency pulses of all said channels into a single transmission circuit, the said means for delaying the signals permitting the radio frequency pulses from the different channels to be interleaved and transmitted in sequence along the single transmission circuit and at a pulse repetition frequency higher than the said repetition frequency in the said channels.

7. An electrical pulse signal communication system comprising a plurality of means for producing pulses of radio frequency electrical energy, each said means having a relatively low frequency pulse input circuit, a radio frequency input circuit, and a voltage controlled higher, radio frequency pulse output enabling element, a plurality of electrical pulse signal circuits connected individually to said relatively low frequency pulse input circuits of said radio frequency pulse producing means, a source of radio frequency electrical energy connected to said radio frequency input circuits of said pulse producing means, a source of a plurality of phase displaced alternating control voltages synchronized with said relatively low frequency pulse signals connected to said voltage control radio frequency pulse output enabling elements of said radio frequency pulse producing means, and means for combining the radio frequency pulse outputs of the plurality of pulse producing means into a single transmission circuit.

8. An electrical pulse signal communication circuit in which pulse signals are transferred between a plurality of channels which carry signals in the form of pulses of relatively low frequency electrical energy occurring at a relatively low repetition rate and a channel which carries corresponding signals in the form of pulses of higher radio frequency electrical energy occurring at a higher repetition rate characterized in that it comprises a plurality of means for producing signal pulses of radio frequency energy which are connected to a source of radio frequency energy for radio frequency excitation and to said relatively low frequency pulse channels for controlling their radio frequency signal output, one of said means being connected between each of a plurality of said relatively low frequency pulse channels and said radio frequency pulse channel.

9. An electrical pulse signal communication circuit in which pulse signals are transferred between a plurality of channels which carry signals in the form of pulses of relatively low frequency electrical energy occurring at a relatively low repetition rate and a channel which carries corresponding signals in the form of pulses of radio frequency electrical energy occurring at a higher repetition rate characterized in that it comprises a plurality of means for producing signal pulses of radio frequency energy, one of said means being connected between each of a plurality of said relatively low frequency pulse channels and said radio frequency pulse channel, each said means comprising an evacuated envelope containing a cathode, means for producing a stream of electrons along a path from said cathode, a helical conductor transmission line extending along a portion of said path in proximity thereto for a distance of several wavelengths at a given operating frequency whereby energy at that frequency may be transferred to the transmission line from an electron stream traversing said path portion, means located along said electron path for deflecting said electron stream whereby it may be diverted from said portion of path in proximity to the transmission line to prevent transfer of radio frequency energy thereto and means located along said electron path between said cathode and said transmission line for impressing radio frequency signal variations upon said electron stream.

10. An electrical pulse signal communication circuit comprising a plurality of channels for carrying electrical pulse signals in the form of pulses of relatively low frequency energy occurring at a relatively low repetition rate, a channel for carrying electrical pulse signals in the form of pulses of higher radio frequency energy occurring at a higher repetition rate, a plurality of means for producing pulses of radio frequency electrical energy which are connected to a source of radio frequency energy for radio frequency excitation and to said relatively low frequency pulse channels for controlling their radio frequency signal output, one of said radio frequency energy pulse signal producing means being connected to each of a plurality of said low frequency pulse signal carrying channels, and means comprising a connection between each of a plurality of said radio frequency energy pulse producing means and said radio frequency signal carrying channel for a systematic transfer of signals therebetween.

11. A communication circuit according to claim 10 in which the said means for producing pulses of radio frequency energy comprises an evacuated envelope containing a cathode, means for producing a stream of electrons along a path from said cathode, a distributed radio frequency transmission circuit extending along a portion of said path in proximity thereto for a distance of several wavelengths at a given operating frequency whereby energy at that frequency may be transferred to said distributed circuit from an electron stream traversing said path portion, means located along said electron path for deflecting said electron stream whereby electrons may be diverted at predetermined times to prevent transfer of energy to said distributed circuit and means located along said electron path between said cathode and said distributed circuit for impressing radio frequency variations upon said electron stream.

12. A communication circuit according to claim 10 in which the said means for producing pulses of radio frequency energy comprises an evacuated envelope containing a helical conductor transmission line having at the said radio frequency a certain axial wave propagation velocity within the range of practical electron velocities, a cathode, means comprising accelerating electrodes and potential sources connected thereto for producing a beam of electrons from the cathode to pass through an aperture in a metal plate substantially perpendicular to the beam and along the axis of said helical conductor to a collector at a velocity substantially the same as said wave propagation velocity, an electrode adjacent to the cathode in the path of the electron beam for controlling the electron emission from said cathode, a pair of electrodes farther along on the path of the electron beam for modulating the velocities of the electrons in said beam at said radio frequency, deflecting electrodes still farther along on the path of the electron beam and disposed on opposite sides thereof for deflecting said electron beam across said aperture in said plate which is still farther along on the path of the beam and is between the deflecting electrodes and said helix, the said electron beam passing along said helix only when not deflected from said aperture, a second cathode annular in shape, means comprising an accelerating electrode and potential source connected thereto for producing a hollow electron beam from said second cathode along and in proximity to said helix and axially directed to said collector at a velocity substantially the same as said wave propagation velocity and resistive means terminating the helical conductor at the end nearest the cathodes, external to the envelope means coupled to the helix at the end farthest from the cathode for deriving radio frequency energy therefrom, terminals connected to said deflecting electrodes for applying deflecting voltage thereto, a transmission line connected to said modulating electrodes and a lead connected to said electron emission control electrode.

13. A communication circuit according to claim 10 in which the said means for producing pulses of radio frequency energy comprises an evacuated envelope one end of which consists of a metallic tube containing a number of apertured, spaced transverse metallic discs to form a loaded wave guide having a certain phase velocity at said radio frequency within the range of practical electron velocities, a cathode, means comprising an accelerating electrode and potential source connected thereto for producing a beam of electrons from the cathode to pass through an aperture in a metal plate substantially perpendicular to the beam and along the axis of said metallic tube at a velocity substantially the same as said wave propagation velocity, an electrode adjacent to said cathode in the path of the beam for controlling the emission from the cathode, a pair of electrodes farther along on the path of the electron beam for modulating the velocities of the electrons in said beam at said radio frequency, deflecting electrodes farther along on the path of the electron beam and disposed on opposite sides thereof for deflecting said electron beam across said aperture in said plate which is still farther along on the path of the beam and is between the deflecting electrodes and said wave guide, the said electron beam passing through said wave guide only when not deflected from said aperture, a second cathode annular in shape, means comprising an accelerating electrode and potential source connected thereto for producing a hollow electron beam from said second cathode and through said wave guide in the same direction as the first-mentioned electron beam and at substantially the same velocity, resistive means terminating the said wave guide at the end nearest the cathodes and coupling means at the other end of the wave guide to derive radio frequency energy therefrom, external to the envelope terminals connected to said deflecting electrodes, a transmission line connected to said modulating electrodes and a lead connected to said electron emission control electrode.

14. A communication circuit according to claim 10 in which the said means for producing pulses of radio frequency energy comprises an evacuated envelope containing a helical conductor transmission line having at the said radio frequency a certain axial wave propagation velocity within the range of practical electron velocities, a cathode, means comprising accelerating electrodes and potential sources connected thereto for producing a beam of electrons from the cathode to pass through an aperture in a metal plate substantially perpendicular to the beam and along the axis of the said helical conductor to a collector at a velocity substantially the same as said wave propagation velocity, an electrode adjacent to said cathode in the path of the electron beam for controlling the electron emission from the cathode, means for connecting this same electrode to a radio frequency circuit for control of electron emission at said radio frequency, deflecting electrodes farther along on the path of the electron beam and disposed on opposite sides thereof for deflecting said electron beam across said aperture in said plate which is still farther along on the path of the beam and is between the deflecting electrodes and said helix, the said electron beam passing along said helix only when not deflected from said aperture, a second cathode annular in shape, means comprising an accelerating electrode and potential source connected thereto for producing a hollow electron beam from said second cathode along and in proximity to said helix and axially directed to said collector at a velocity substantially the same as said wave propagation velocity and resistive means terminating the helical conductor at the end nearest the cathodes, external to the envelope means coupled to the helix at the end farthest from the cathode for deriving radio frequency energy therefrom, terminals connected to said deflecting electrodes for applying deflecting voltages thereto, a transmission line coupled to said electron emission control electrode for radio frequency control and terminals coupled to said electron emission control electrode for lower frequency control.

15. A communication circuit according to claim 10 in which the said means for producing pulses of radio frequency energy comprises an evacuated envelope containing a helical conductor transmission line having at said radio frequency a certain axial wave propagation velocity within the range of practical electron velocities, loss material capable of absorbing radio frequency energy in proximity to the helix near the center of its length, a cathode, means comprising an eccelerating electrode and potential source connected thereto for producing a beam of electrons from the cathode along the axis of the helical conductor to a collector at a velocity substantially the same as said wave propagation velocity and an electrode adjacent to the cathode in the path of the electron beam for controlling the electron emission from said cathode, external to said envelope a wave transmission circuit coupled to the end of the helical conductor nearest the cathode for impressing a radio frequency wave on the helix, a wave transmission circuit coupled to the other end of the helical conductor for deriving radio frequency energy therefrom, a radio frequency magnetic electron beam deflecting coil located in closed proximity to the envelope and the path of the electron beam between the end of the helix nearest the cathode and the location of said loss material, means coupled to said deflecting coil for supplying deflecting energy thereto and leads connecting to said control electrode for controlling the emission from the cathode.

16. A communication circuit according to claim 10 in which the said means for producing pulses of radio frequency energy comprises an evacuated envelope containing two helical conductor transmission lines disposed along a common axis and spaced apart longitudinally, each adjacent end being terminated by resistive material capable of absorbing radio frequency energy, each said line having at the said high frequency a certain axial wave propagation velocity within the range of practical electron velocities, a cathode, means comprising an accelerating electrode and potential soure connected thereto for producing a beam of electrons from the cathode along the axis of the helical conductor lines to a collector at a velocity substantially the same as said wave propagation velocity, an electrode adjacent to the cathode in the path of the electron beam for controlling the electron emission from said cathode and a pair of deflecting plates in the space between the two helical conductor lines disposed on opposite sides of the path of the electron beam, external to the envelope a wave transmission circuit coupled to the end of the helical conductor nearest the cathode for impressing a radio frequency wave on the helix, a wave transmission circuit coupled to the other end of the helical conductor for deriving radio frequency energy therefrom, a coupling circuit connected to said deflecting plates for supplying electron beam deflecting voltage thereto and leads connecting to said control electrode for controlling the emission from the cathode.

17. An electrical pulse signal communication circuit comprising means for receiving from each of a plurality of signal channels electrical signal pulses of a given repetition frequency, the pulses in all of the channels being in fixed time relation, means associated with said receiving means for delaying by different amounts the pulses from the different channels, means individual to each said channel connected to said receiving means for converting each said signal pulse into a shorter pulse of radio frequency energy, each such shorter pulse comprising a train of radio frequency oscillations, means connected to said converting means for combining said shorter radio frequency pulses of all said channels into a single channel transmission circuit, the said means for delaying the pulses permitting the shortened pulses from the different channels to be interleaved and transmitted in sequence along the single channel transmission circuit and at a pulse repetition frequency higher than the said repetition frequency in the said channels.

18. An electrical pulse signal communication circuit comprising means for receiving from each of a plurality of signal channels electrical signal pulses of a given repetition frequency, the pulses in all of the channels being in fixed time relation, means associated with said receiving means for delaying by different amounts the pulses from the different channels, means individual to each said channel connected to said receiving means for converting each said signal pulse into a pulse of radio frequency energy comprising a train of radio frequency oscillations, means connected to said pulse converting means for making the radio frequency pulses shorter than the corresponding said signal pulses, means connected to said converting means for combining said shorter radio frequency pulses of all said channels into a single channel transmission circuit, the said means for delaying the pulses permitting the shorter pulses from the different channels to be interleaved and transmitted in sequence along the single transmission circuit and at a pulse repetition frequency higher than the said repetition frequency in the said channels.

19. An information transmission system comprising means for receiving from each of a plurality of signal channels electrical pulse signals of a given pulse repetition frequency, the pulses in all of the channels being in fixed time relation, means associated with said receiving means for delaying by different amounts the pulses from the different channels, a plurality of means individual to each said channel connected to said receiving means for converting the said signal pulses into corresponding pulses of radio frequency energy each of which is shorter than the corresponding said signal pulse and comprising a train of radio frequency oscillations, means connected to said converting means for combining the said radio frequency pulses of all said channels into a single channel transmission circuit, the said means for delaying the signals permitting the radio frequency pulses from the different channels to be interleaved and transmitted in sequence along the single channel transmission circuit and at a pulse repetition frequency higher than the said repetition frequency in the said signal channels.

20. A signal transmission system comprising means for accepting from a plurality of signalling channels electrical signal pulses having a given pulse length and pulse repetition rate, a plurality of means connected to said accepting means for producing, as determined by said signal pulses, radio frequency signal pulses of shorter length and displaced in time in accordance with the different channel sources, said radio frequency signal pulse producing means being connected to a source of radio frequency energy for radio frequency excitation and to said signalling channels for controlling their radio frequency signal outputs, means connected to said radio frequency pulse producing means for combining into a single transmission channel the radio frequency pulses derived from the plurality of channels and transmitting them on said single channel at a repetition rate higher than said repetition rate of the pulses on the plurality of channels, means for receiving radio frequency electrical pulse signals on a single communication channel, the said signals received containing pulses originating from and destined for a plurality of communication channels and being distinguishable by their relative arrival times, plurality of radio frequency pulse translating means each connected to said single communication channel and between said receiving means and said destination channels and operatively connected to a synchronous sweep generator and means for maintaining said sweep generator in synchronism with said received pulses comprising a circuit connecting said sweep generator to said receiving means, whereby radio frequency signal pulses are received and distributed to the plurality of destination channels in accordance with their channels of origin.

21. A signal translating system comprising a plurality of means for producing short pulses of radio frequency energy when made operative at short intervals while energized by longer signal pulses, means connecting each of said plurality of means for producing pulses of radio frequency energy to a source of radio frequency excitation, means connected to sources of said longer signal pulses for applying energizing pulses to said radio frequency pulse producing means in sequence, means connected to each said radio frequency pulse producing means for making it operative for a period shorter than the period of said longer signal pulses during application of each signal energizing pulse and means connected to said radio frequency pulse producing means for combining their pulse outputs and transmitting them on a single communication channel.

References Cited in the file of this patent

UNITED STATES PATENTS

| | | |
|---|---|---|
| 2,427,500 | Houghton | Sept. 16, 1947 |
| 2,444,073 | Tomlin | June 29, 1948 |
| 2,452,561 | Gibson | Nov. 2, 1948 |
| 2,454,815 | Levy | Nov. 30, 1948 |
| 2,468,059 | Grieg | Apr. 26, 1949 |
| 2,478,920 | Hansell | Aug. 16, 1949 |
| 2,506,613 | Ransom | May 9, 1950 |
| 2,603,714 | Meacham | July 15, 1952 |